Oct. 23, 1956   F. H. REAM   2,767,543
ROTATING CUTTING DISC TYPE MOWER
Filed May 13, 1953   3 Sheets-Sheet 3
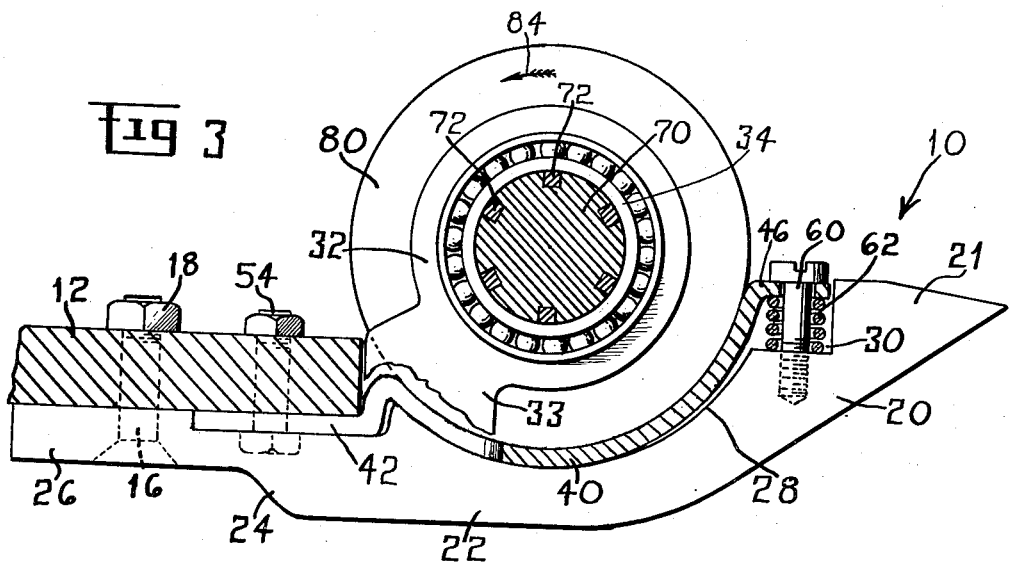
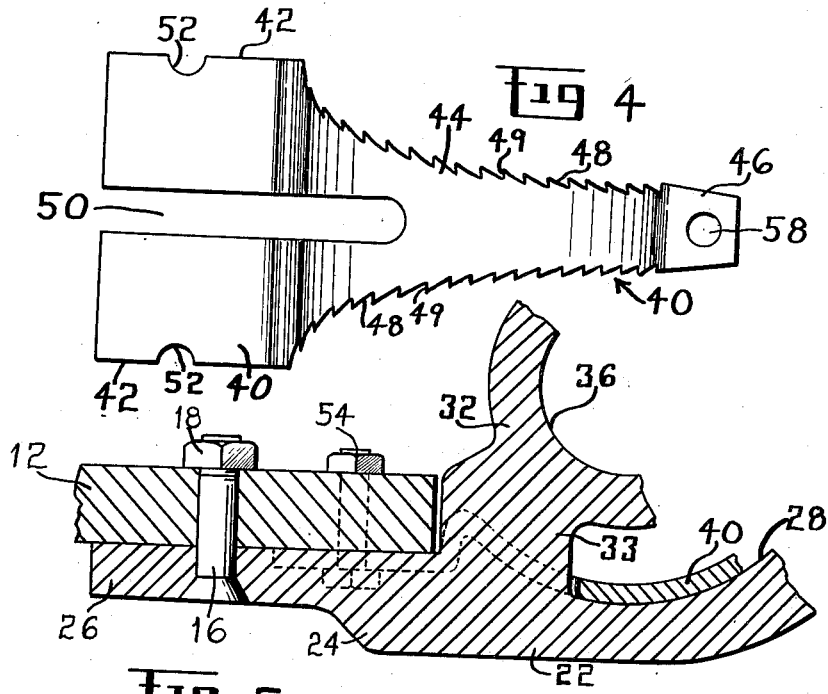
INVENTOR.
FRED H. REAM
BY
HIS ATTORNEY

United States Patent Office 2,767,543
Patented Oct. 23, 1956

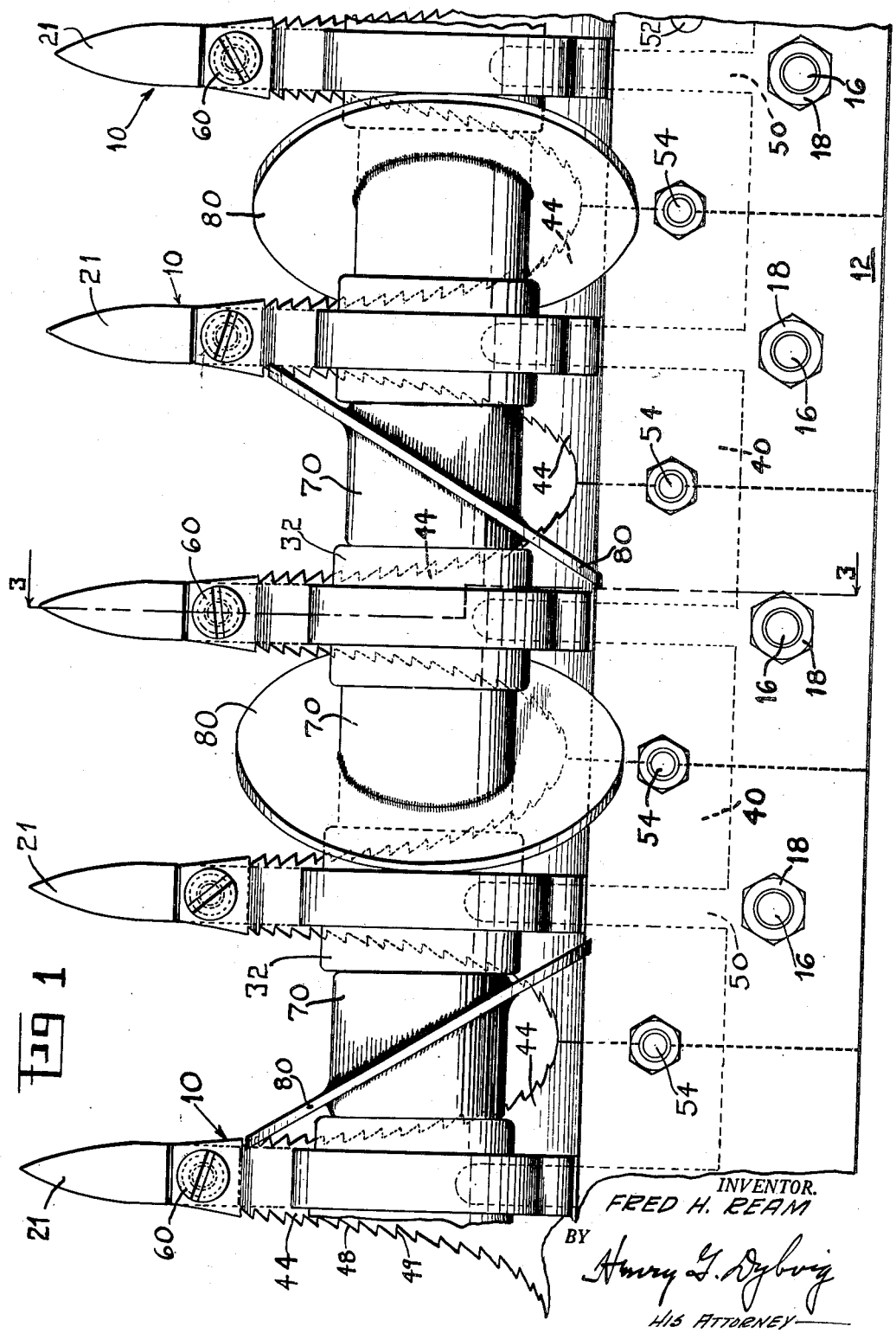

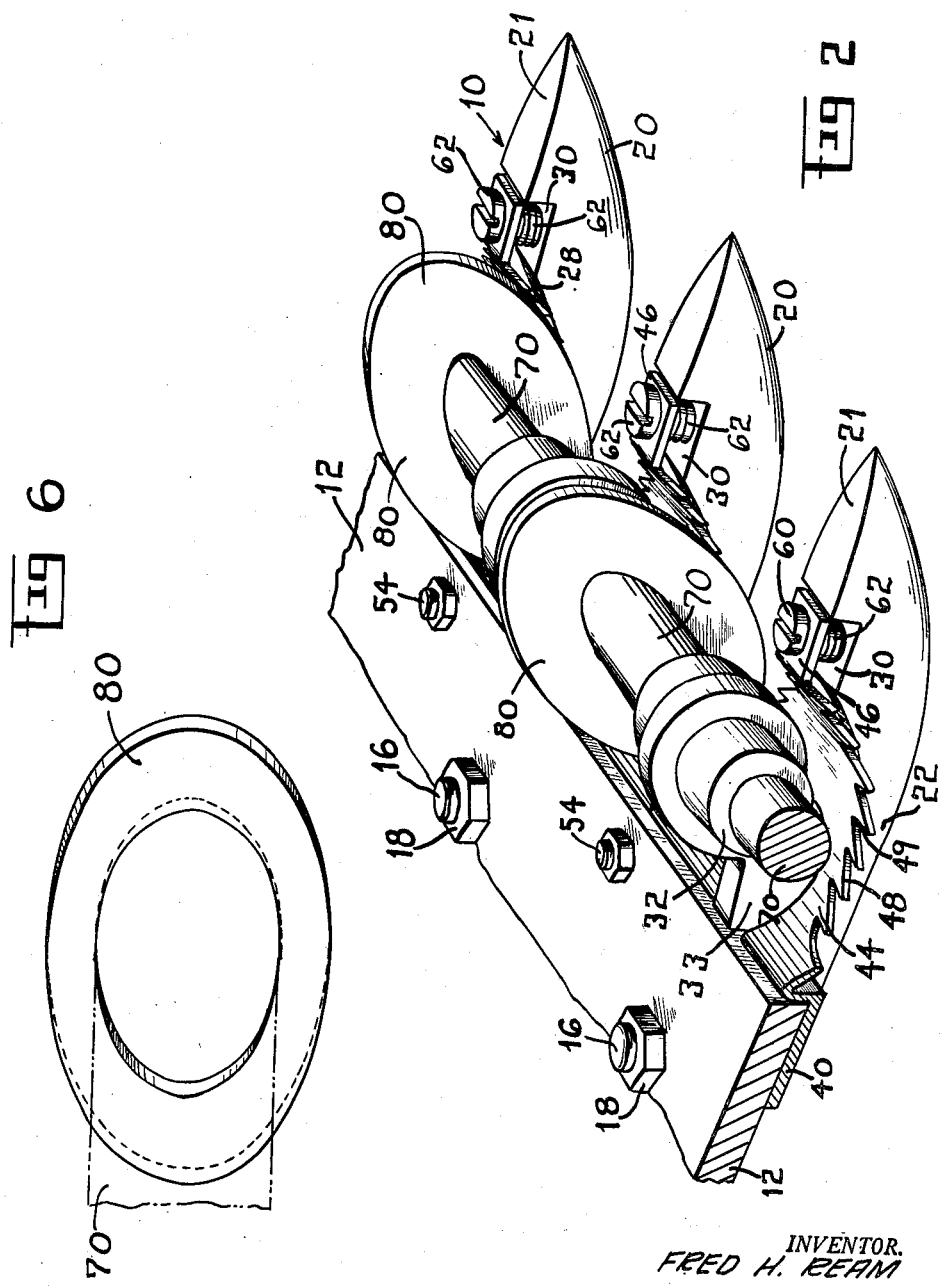

2,767,543

ROTATING CUTTING DISC TYPE MOWER

Fred H. Ream, Dayton, Ohio

Application May 13, 1953, Serial No. 354,763

8 Claims. (Cl. 56—249)

This invention relates to a mower. It relates more particularly to a mower which has a rotating cutting blade, rather than a conventional reciprocating cutting blade.

This invention is an improvement upon the device disclosed in my United States Letters Patent No. 2,619,786, issued December 2, 1952, for rotating cutting disc type mower.

One object of the invention is to provide a rotary cutting unit for a mowing machine which is simple in construction, efficient in operation and of such a character that a plurality of units may be assembled in axial alignment on a single supporting bar.

A further object of the invention is to provide a cutting unit comprising a rotary cutting element cooperating with a stationary cutting element and having means for moving grass or the like laterally toward said stationary cutting element as the unit moves forwardly.

A further object of the invention is to provide a mower having rotatable elliptical cutting elements cooperating with stationary cutting elements.

A further object is to provide a high speed cutting device which is smooth in operation, functioning without vibration.

A further object of the invention is to provide such a mower having simple and efficient means for mounting a rotatable cutting element between two guards or ground engaging shoes.

Other objects and advantages reside in the construction of parts, the combination thereof and the mode of operation, as will become more apparent from the following description.

In the accompanying drawings,

Figure 1 is a fragmentary, top plan view of a mower of this invention.

Figure 2 is a fragmentary, perspective view of a mower of this invention.

Figure 3 is a sectional view taken substantially on the line 3—3 of Figure 1.

Figure 4 is a plan view of one of the ledger plates of the mower of this invention.

Figure 5 is a fragmentary, sectional view showing a portion of the guard and bearing support of the invention.

Figure 6 is a perspective view of a cutting disc of the invention.

Cutting elements of a mower of this invention, as shown in the drawings, may be extended to any desired length. The length is dependent upon the number of cutting units attached in linear relationship, as best shown in Figures 1 and 2. The mower may be mounted on any suitable movable support. It may comprise a part of a mowing machine or may be provided with means of a well known character for connecting the mower with a tractor by which the cutting elements are driven from a power output device of the tractor.

Referring to the drawings, the mower comprises a plurality of shoes or guards 10 which are firmly attached to a support bar 12 by any suitable means, such as by bolts 16 having nuts 18. Each guard or shoe 10 is in the nature of a runner having an upwardly and forwardly inclined lower surface 20 forming a toe 21. Each guard 10, also, has a rearwardly extending flat ground-engaging portion 22. These features enable the guard to move over uneven ground or over obstructions on the ground. The lower portion of each guard has an angular offset 24, providing a rear portion 26, which is slightly higher than the ground engaging portion 22. Each guard or shoe 10 is provided with an arcuate recess 28 in the upper part thereof and a notch 30 in the toe 21. A bearing support 32 is integrally attached by a leg 33 to the guard 10 at the rearward part of the arcuate recess 28. The bearing support 32 extends upwardly and forwardly over the arcuate recess 28 and firmly retains an antifriction bearing 34 within a circular aperture 36, as clearly shown in Figures 3 and 5.

A ledger plate or cutting plate 40, comparatively thin in cross section, has parallel side portions 42 at the rearward part thereof. The sides of the ledger plate have arcuately converging serrated portions 44 extending from the forward ends of the parallel side portions 42 to a front tip 46 of the ledger plate. Each serration of the serrated portion 44 has an edge 48 which is angularly disposed and an edge 49 which is normal to the longitudinal axis of the ledger plate 40, as clearly disclosed in Figures 1, 2 and 4. The serrated portion of the ledger plate 40 is curved downwardly, so that the ledger plate has substantially the same curvature as the arcuate recess 28 of the shoe. Midway between the parallel side portions 42 is a longitudinal slot 50, open at the rearward end thereof and extending forwardly into the arcuate section of the ledger plate. The slot 50 is of such a width that the rearward part of the ledger plate can straddle the leg 33 of the bearing support and can be mounted upon the guard 10 by sliding the ledger plate rearwardly. Therefore, an equal portion of the ledger plate 40 extends at each side of the guard 10.

The parallel side portions 42 of the ledger plate 40 are provided with semi-circular notches 52, adapted to fit bolts 54 to retain the ledger plate 40 to the support bar 12. The tip 46 of the ledger plate 40 is provided with an aperture 58 and resiliently engages adjustment bolt 60 by means of a helical spring 62 in the notch 30 of the toe 21. The spring 62 resiliently holds the serrated portion of the ledger plate from normal engagement with the arcuate recess 28, as clearly shown in Figure 3. Shearing engagement is thereby maintained between the ledger plate and the rotating cutting blade, as will hereinafter be described. As a result of the simplicity in the mounting of a ledger plate 40, it is readily removable from the mower for replacement or for sharpening of the serrations.

A drive shaft 70 is firmly retained within the antifriction bearings 34 by means of keys or splines 72. The drive shaft 70 extends from one bearing support 32 to another and is rotatably retained in the bearings 34 and is normal to the longitudinal axis of the guards 10. Rigidly mounted upon the drive shaft 70 between each two adjacent guards 10 is an elliptical cutting disc 80. Each cutting disc 80 is angularly disposed with respect to the axis of the drive shaft 70. The edge of each cutting disc 80 is sharpened at a varying angle around the periphery thereof, so that there is cutting action between each engaging portion of the edge of the cutting disc and the ledger plate 40 as the cutting disc 80 revolves in a direction as shown by arrow 84 in Figure 3. The rearward part of the cutting disc 80 moves forwardly and downwardly and has shearing engagement with the curved surface of the serrated portion 44 of the ledger plate 40. The cutting discs 80 rotate in a direction opposite to the direction of rotation of the wheels of a mowing machine or tractor upon which the mower is moved. Therefore, cutting action of the edges of the cutting discs is forwardly and in the direction of movement of the mower. Due to the fact that the cutting discs 80 are supported upon the drive shaft 70 angularly with respect to the shaft, a gathering action in the grass is obtained by the cutting discs as they are rotated. The gathering action of the cutting discs 80 brings the material to be cut into engagement with the serrations of the ledger plate 40 and the edges of the cutting discs 80. Blades of grass or other foliage to be cut by the mower are forced by the cutting discs 80 against the edges 48 and 49 of the serrations of the ledger plate and are readily severed as the cutting discs rotate. The cutting disc 80 is so positioned with respect to the ledger plate 40 that there is shearing engagement between them as the cutting disc 80 rotates. Adjustment of the position of the ledger plate 40 with respect to the cutting disc 80 is obtained by means of the bolt 60 which retains the height of the tip 46 of the ledger plate 40 upon the spring 62. The spring 62 is further provided as a release of the position of the ledger plate 40 if a hard unseverable foreign object such as of stone or steel material finds its way between the ledger plate 40 and the cutting disc 80. Release of the position of the ledger plate 40 by means of the spring 62 alleviates possibility of damage to the ledger plate or to the cutting disc. When a foreign object is engaged between the ledger plate and the cutting disc, the spring 62 allows movement of the ledger plate downwardly and farther into the recess 28.

Due to the fact that the moving parts rotate rather than reciprocate, as in a conventional mowing machine, a mower of this invention functions with negligible vibration. The mower and its parts may be operated at a very high rate of speed due to the fact that the speed is not limited by vibration.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having described my invention I claim:

1. A cutting unit for a mower of the type comprising a cutter supporting bar movable transversely to its length, including a ground engaging shoe having means for attachment to the supporting bar, an arcuate fixed blade having cutting edges extending laterally from the ground engaging shoe, the fixed blade being supported by the ground engaging shoe, an elliptical element having a cutting edge slidably engageable with the fixed blade along a portion thereof, the elliptical element being supported adjacent the ground engaging shoe for rotation about an axis normal to the line of movement of the ground engaging shoe, and means for rotating the elliptical element in a direction such that the cutting movement of the cutting edge is substantially in the direction of movement of the ground engaging shoe.

2. In a mower comprising a supporting bar movable transversely to its length, including a plurality of guard members, means for securing the guard members to the supporting bar in forwardly extending relation thereto, a plurality of elliptical cutting elements rotatably supported by the guard members, each of the cutting elements having a cutting edge at the periphery thereof, a serrated cutting blade secured to the supporting bar, the serrated cutting blade having cutting edges extending laterally from the guard members, and means for rotating the elliptical cutting elements for shearing engagement with the serrated cutting blade so that the cutting movement of the cutting edge of the elliptical cutting elements is substantially in the direction of movement of the guard members.

3. In a mowing machine of the type having rotatable supporting wheels for movement of the machine and having a cutter supporting bar movable normal to its length, including a ground engaging shoe having means whereby it may be secured to the supporting bar in forwardly extending relation thereto, a fixed blade having a wardly portion thereof resiliently supported on said ground engaging shoe, the cutting edges of the fixed blade extending laterally from the ground engaging shoe, an elliptical cutting device supported adjacent said ground engaging shoe for rotation about an axis transverse to the line of movement of the ground engaging shoe, the cutting device being in engagement with the fixed blade, and means for rotating the elliptical cutting device in a direction opposite to the direction of rotation of the supporting wheels of the mowing machine.

4. A cutting unit for a mower of the type comprising a cutter supporting bar movable transversely to its length, including a plurality of ground engaging shoes having means whereby they may be secured to said bar in forwardly extending and longitudinally spaced relation thereto, a shaft rotatably carried by the shoes, a plurality of arcuate fixed blades having the forward portion thereof resiliently supported by the shoes, each blade having a plurality of cutting edges extending laterally therefrom, and a plurality of cutting discs angularly mounted on said shaft for rotation about the axis thereof adjacent the fixed blades on the respective shoes, said cutting discs slidably engaging the fixed blades along a portion thereof and rotating in a direction such that cutting movement of the discs is substantially in the direction of movement of the cutting unit.

5. A cutting unit for a mower of the type comprising an elongate supporting structure movable transversely to its length, the combination including an elongate guard member attached to the supporting bar normal thereto, the guard member having a forward end and a rearward end and being provided with a vertical arcuate recess in the upper portion thereof intermediate the ends thereof, the recess extending the width of the guard member, a screw member vertically and adjustably attached to the guard member adjacent the forward end thereof, the screw member having a head member thereon, a helical spring encircling the screw member, a cutting plate rigidly attached to the guard member adjacent the rearward end thereof, the cutting plate having an arcuate body section extending downwardly into the arcuate recess of the guard member, the cutting plate being provided with a serrated cutting edge extending from the guard member at the side thereof, the cutting plate having a forward end supported by the helical spring and positioned under the head member of the screw member, the spring member resiliently supporting a portion of the arcuate body section of the cutting plate, a shaft member rotatably supported by the elongate supporting structure in substantially parallel relation thereto, an elliptical cutting disc supported by the shaft member in angular relation to the shaft member, the cutting disc having a peripheral cutting edge a portion of which continuously contacts the arcuate body portion of the cutting blade, and means for rotating the shaft member so that the portion of the cutting edge of the cutting disc contacting the arcuate body portion moves forwardly during cutting operation.

6. A cutting unit for a mower the combination comprising a supporting structure, a shaft member rotatably supported by the supporting structure, an arcuate cutting plate being elongate and having a forward portion and a rearward portion, the cutting plate having the forward portion thereof resiliently supported by the supporting structure, the arcuate cutting plate having a plurality of cutting edges extending normal to the longitudinal axis of the cutting plate, and a cutting disc angularly attached to the shaft member, the cutting disc having a peripheral cutting edge slidably engageable with the arcuate cutting plate along the length thereof, the cutting disc being rotatably so that the cutting edge of the cutting disc is movably engageable with the arcuate cutting plate from the rearward portion of the arcuate cutting plate toward the forward portion thereof during cutting operation.

7. A mowing machine comprising an elongate supporting structure movable transversely to its length, a plurality of tapered stationary cutting plates attached to the supporting structure normal to the longitudinal axis thereof, each cutting plate having a narrow forward end and a wider rearward end, the cutting plates being carried substantially in horizontal juxtaposed relation by the supporting structure, each cutting plate being provided with a downwardly extending arcuate portion intermediate the ends thereof, the downwardly extending arcuate portion having a plurality of cutting edges extending normal to the longitudinal axis of the cutting plate, a shaft rotatably supported by the supporting structure in parallel relation thereto, a plurality of elliptical cutting discs disposed in spaced relation one to the other and angularly attached to the shaft, adjacent cutting discs being angularly disposed one with respect to the other, each cutting disc having a peripheral cutting edge slidably engageable with the arcuate portion of two adjacent cutting blades, and means for rotation of the shaft causing the cutting edges of the cutting discs to move toward the forward portion of the cutting plates during cutting engagement with the cutting blades.

8. A mower machine comprising a movable support structure, a plurality of aligned stationary cutter plates, each of the cutter plates having an arcuate portion provided with a plurality of laterally extending cutting edges, each of the cutter plates having a portion thereof resiliently supported by the support structure, a shaft rotatably supported at substantially the radial center of the arcuate portion of the cutter plates, a plurality of elliptical discs angularly attached to the shaft, each of said discs being provided with a cutting edge engageable with the arcuate portion of one of the cutter plates, and means for rotating the shaft in a direction so that the cutting discs slidably engage the arcuate portions of the cutter plates in substantially the direction of movement of the mower machine.

References Cited in the file of this patent

UNITED STATES PATENTS

| Number | Name | Date |
|---|---|---|
| 17,745 | Manny | July 7, 1857 |
| 2,282,238 | Newton | May 5, 1942 |
| 2,341,913 | Fields | Feb. 15, 1944 |
| 2,484,071 | Brauer | Oct. 11, 1949 |
| 2,526,821 | Jones | Oct. 24, 1950 |
| 2,539,794 | Ream | Jan. 30, 1951 |
| 2,590,788 | Novak | Mar. 25, 1952 |